(No Model.) 4 Sheets—Sheet 1.

C. MARTIN.
MATCH MAKING AND DIPPING MACHINE.

No. 349,113. Patented Sept. 14, 1886.

(No Model.) 4 Sheets—Sheet 3.

C. MARTIN.
MATCH MAKING AND DIPPING MACHINE.

No. 349,113. Patented Sept. 14, 1886.

Witnesses:
C. W. H. Brown.
T. S. Brawner.

Inventor
Charles Martin
By Wallace & Bartlett
atty.

(No Model.) 4 Sheets—Sheet 4.
C. MARTIN.
MATCH MAKING AND DIPPING MACHINE.
No. 349,113. Patented Sept. 14, 1886.
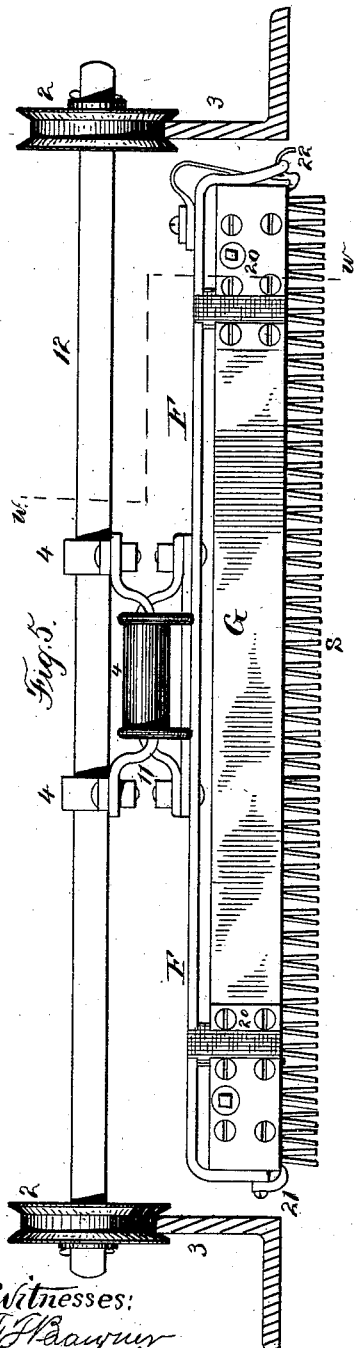
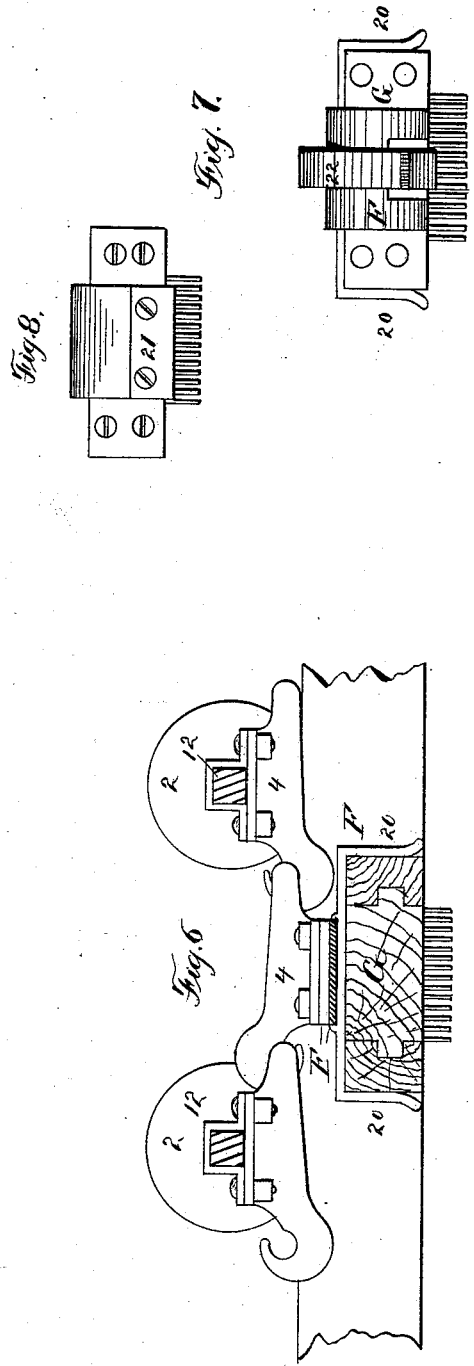
Witnesses:
Inventor:
Charles Martin
By Wallace A Bartlett
Atty.

UNITED STATES PATENT OFFICE.

CHARLES MARTIN, OF TORONTO, ONTARIO, CANADA.

MATCH MAKING AND DIPPING MACHINE.

SPECIFICATION forming part of Letters Patent No. 349,113, dated September 14, 1886.

Application filed May 26, 1886. Serial No. 203,309. (No model.)

*To all whom it may concern:*

Be it known that I, CHARLES MARTIN, residing at Toronto, in the county of York, Province of Ontario, Canada, have invented certain new and useful Improvements in Match Making and Dipping Plant, of which the following is a specification, reference being had therein to the accompanying drawings.

This invention relates to match dipping and drying machinery.

The object of the invention is to produce a match-dipping plant in which the work of conveying, dipping, and drying the matches shall be automatically performed.

The invention consists in certain improvements in the conveying machinery and its relation to the splint-producing machines; also, in the mechanism for heating the chemicals and for drying the dipped matches; also, in the mechanism for removing the noxious gases and preventing them from inflicting injury on the operatives; also, in minor details of construction and combinations of parts, as hereinafter pointed out in the claims.

Figure 1:
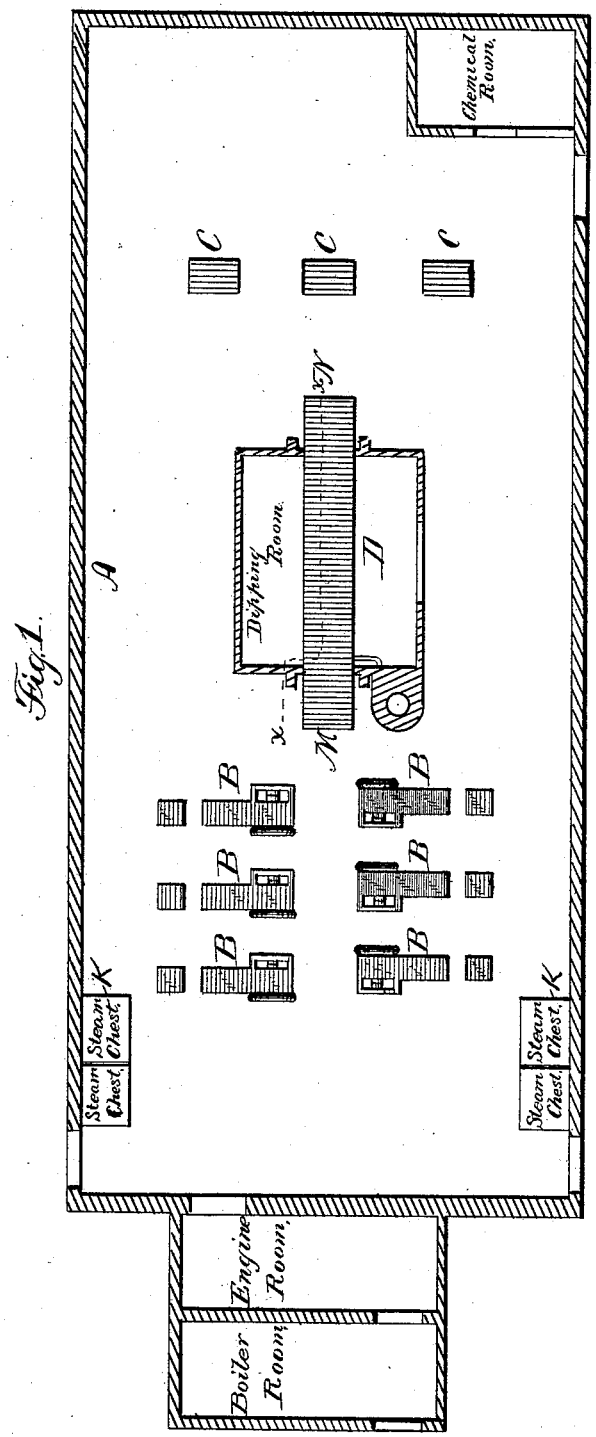
Figure 2:
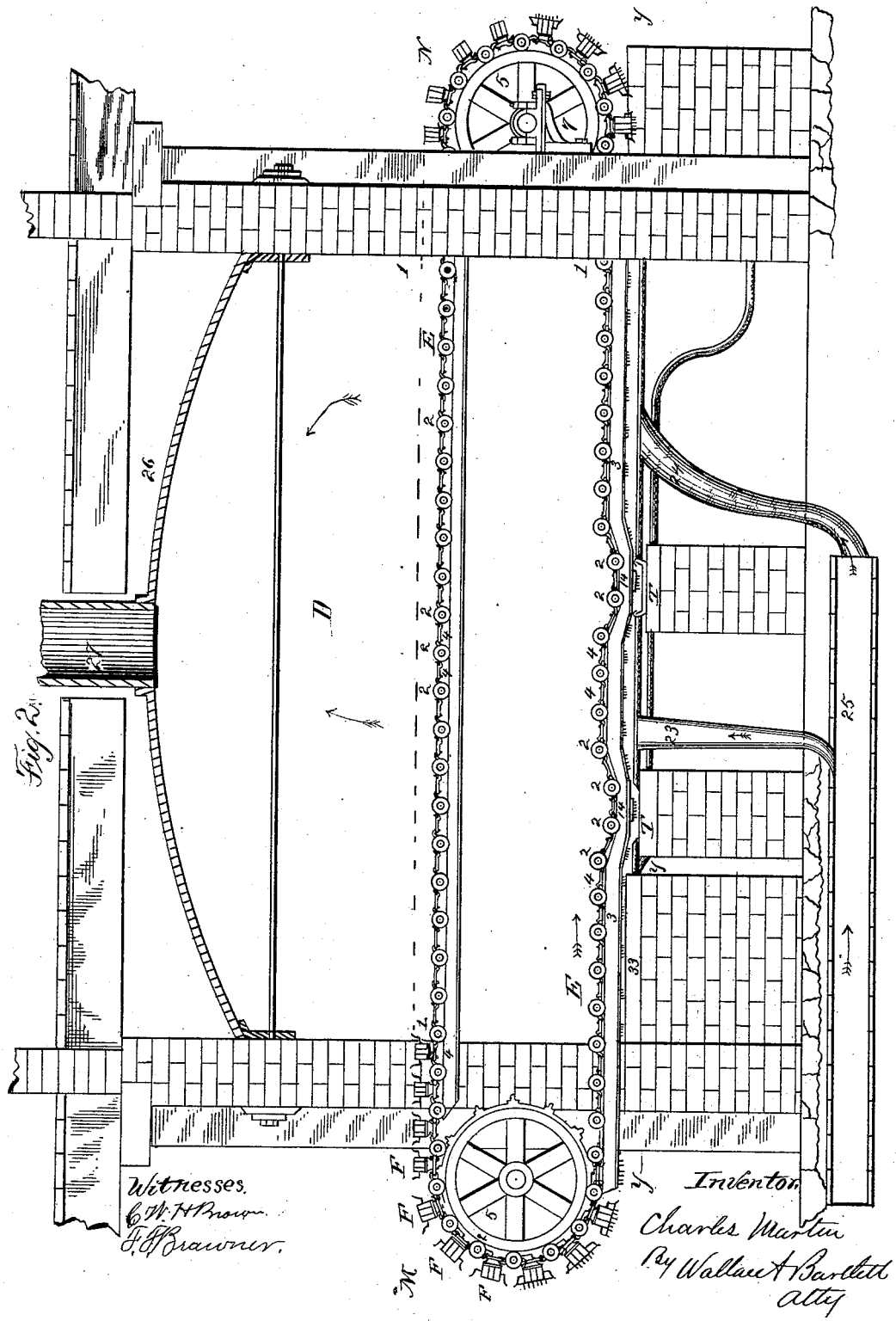
Figure 3:
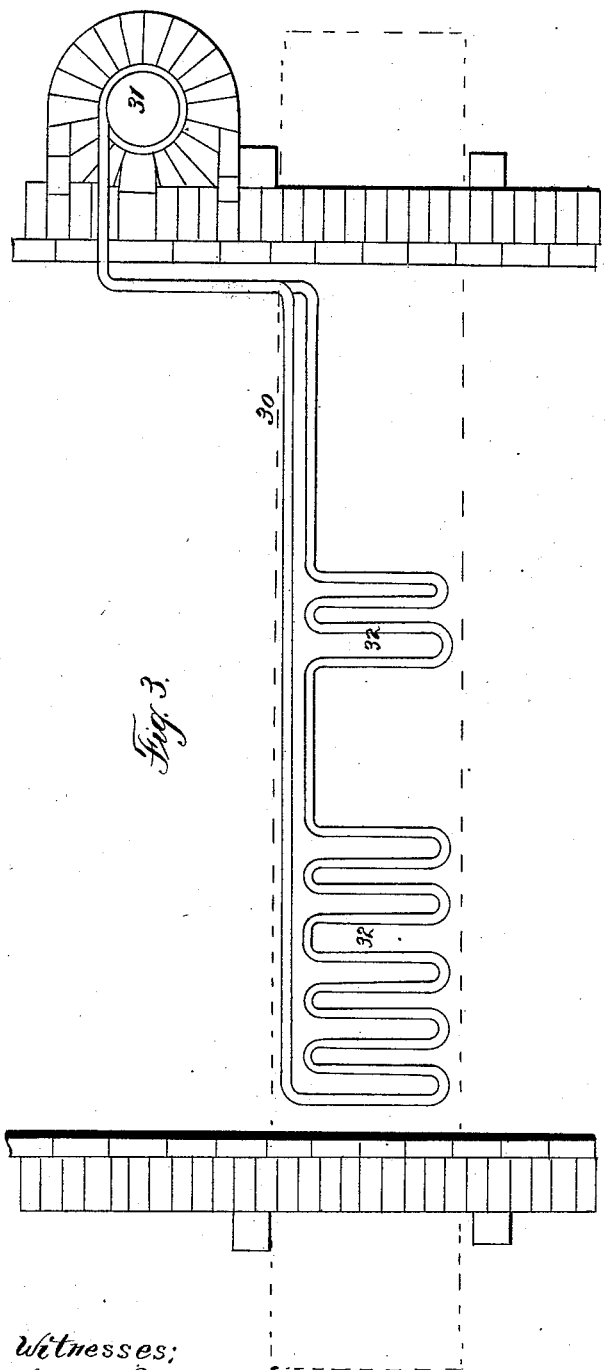
Figure 4:
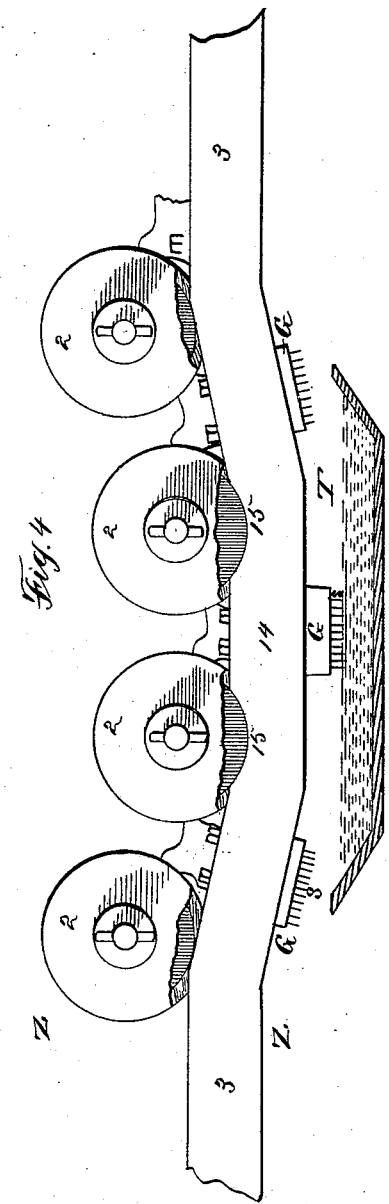

Figure 1 is a ground plan of a match-making plant containing, generally, the improvements which make this invention. Fig. 2 is a vertical longitudinal section of the dipping-room and appliances, taken on the line $x\,x$, Fig. 1. Fig. 3 is a horizontal section on line $y\,y$, Fig. 2, of the heating apparatus, parts being omitted. Fig. 4 is a diagram illustrating, as a side elevation, a portion of the track and conveyer-tracks and, as section, one of the dipping-pans. Fig. 5 is a cross-section on line $z\,z$, Fig. 4, of the conveyer and trucks. Fig. 6 is a cross-section on line $w\,w$, Fig. 5. Fig. 7 is an end view of the tray-holding frame of the endless carrier and its catches. Fig. 8 is a reverse view of the tray and catch.

In the diagram, Fig. 1, A represents the outline of the building which contains the machinery of the plant.

B B, &c., represent a number of match-splint-making machines arranged, as shown, in juxtaposition to the drying-chamber D, through which the endless conveyer carries the match-trays as received from the splint-machines, and delivers the dipped matches at the other side of the chamber.

The match-splint machines B B are preferably such as are described in my application No. 201,175, filed May 5, 1886, and are all arranged with the ends from which the trays are delivered approximating a continuation of the endless carrier. The trays may be such as are described in my application No. 201,323, filed May 6, 1886, or other suitable trays which will hold the matches firmly suspended and spaced from each other.

The relative position of other parts of the operative mechanism of the plant are also indicated in Fig. 1.

The dipping-chamber D is a closed room, preferably of brick-work, provided with glazed windows, and having openings 1 at each end for the passage of endless-chain carrier E. The endless carrier E is composed of a series of trucks, 2 2, which ride on the tracks 3 3, and are connected by links 4 4, &c. The endless chain passes round the sprocket-wheels 5 5, which are secured to or turn on shafts 6 6, said shafts having bearings 7 at the outer ends of the dipping-chamber. One or the other of the sprocket-wheels 5 5 is driven from the engine, so that the endless carrier E shall move constantly forward.

Between the trucks 2 there is a frame, F, into which a tray, G, containing match-splints, may be placed. The frame F is attached to ties 11 11, which are bolted, riveted, or otherwise secured to the links 4, which links connect the axles or bars 12 12 of the trucks, thus forming an endless apron which passes round the sprocket-wheels 5 5. The tracks 3 3 incline downward from their general horizontal position, where they pass across the troughs or pans T T, and rise again beyond the troughs, those portions of the track just over the troughs being parallel with the surface of the chemicals contained in the troughs, these depressions 14 in the track being equal to or greater than the distance of the trucks from each other. At each side of these depressed portions 14 of the track there is a notch in the track, as shown at 15 15, Fig. 4, just fitting a segment of one of the trucks 2, and these notches are as far from each other as the distance between the trucks. It follows that as the endless chain is moved and the trucks drawn along the tracks, when the trucks reach the inclines in the track they will follow them, and so move along the depressions in the track parallel with the face of the chemical contained in the troughs T. When the trucks reach the notches 15 in the track, they will drop into these notches, and will carry the links 4 and the suspended match-trays, which are between these trucks, perpendicularly downward, thus dipping the matches contained in these trays into the paraffine, sulphur, or other chemical in the trough.

The match-trays G have the match-splints S secured in them and spaced from each other, so that the chemical will not adhere to more than one match. These trays are dropped in between the fingers 20 of the frame F, and are supported at one end by hooks 21, and at the other end by spring-clasps 22. The match-trays can be readily inserted in these frames in the endless conveyer at the point M, Fig. 1, and are carried down by the conveyer, moving slowly forward to the first trough T, which contains the sulphur or other chemical into which the ends of the splints are first dipped, the splints falling and rising in about a vertical direction, so that there is no tendency to drag the chemical to one side of the trough or to coat the splints unevenly.

As the trays G, containing the dipped matches, move along through the dipping-chamber, the matches contained therein are exposed to an air-blast through the pipes or nozzles 23 and 24, which receive an air-supply from the air-trunk 25. The air-blasts not only tend to dry the matches, but carry the fumes of the chemicals upward to the arch 26, which forms the roof of the drying-chamber, and so out of the ventilating-flue or flues 27.

The chemicals in troughs T are kept at a proper temperature by the hot-water pipes 30, (see Fig. 3,) which enter the chamber from any suitable source of supply, as a boiler or heater, 31, and are coiled or stacked, as at 32 under the troughs T, or under drying-plates, as 33, interposed between the coils and the ends of the matches. The chemical in the troughs is kept at a uniform height by apparatus communicating with the exterior of the drying-chamber, and the consistence of the chemicals, as well as the temperature, can be observed through the glazed openings in the chamber. The pipe 30 preferably contains hot water under pressure, due provision being made for the circulation thereof; but steam may be used instead, or other means of heating may be substituted without changing the operation of the endless conveyer and its operative mechanism.

The tables or racks C C, &c., are arranged conveniently to the delivery end of the endless-chain carrier, to receive the trays as they come from the dipping-chamber.

The steam-chests K K, in proximity to the splint-machines, enable the blocks to be readily delivered to said machines.

The machines B should automatically cut and space the match-splints and deliver them in trays in convenient proximity to the dipping-chamber. The endless conveyer, moving at a rate of some six or eight feet per minute, will receive the trays from the six machines at B B. While passing through the dipping-chamber D, the matches are dipped in and coated with paraffine or other chemical, according to the kind of match, and are tipped with phosphorus and dried. (All this part of the operation is automatic and in the closed chamber, from which the fumes are not allowed to escape save by the ventilating-flue.) The trays, with the dipped and dried matches, are delivered from the carrier at N, in proximity to the packing-tables or storage-frames C. The endless carrier in its return over the top of sprocket-wheels 5 5 goes empty without the match-trays G.

I do not herein claim, broadly, an endless carrier passing through a closed chamber containing the chemicals, as this is claimed in my application No. 111,216, filed November 8, 1883.

I claim—

1. The combination, with an endless match-dipping carrier, of a series of match-splint machines, each having its delivery end in proximity to said carrier, substantially as described.

2. The combination, with the closed chamber, a trough for chemicals contained therein, and an endless carrier passing over said trough, of an air-blast apparatus below the carrier and an escape-flue from the chamber above the carrier, as set forth.

3. The trucks and axle, the links secured to said axle, the frame, and its holding-ties, combined with the match-tray supported in said frame, substantially as described.

4. The combination, with an endless carrier, of the supporting-frame tied to the links thereof, the side supporting-fingers, and the spring-clasp for sustaining the match-trays, as set forth.

5. The combination, with the endless carrier, the frame having side fingers and hook at one end and a spring-catch at the other end, of a match-tray supported with the matches in pendent position by said catch, substantially as described.

6. The combination, with the endless carrier, constructed, substantially as described, to dip the matches into the chemical-trough, of the trough for chemicals, the heating apparatus for the same, and the air-blast mechanism in proximity to the carrier, as set forth.

7. The combination, with the endless carrier for dipping matches, of the series of match-splint machines with their delivery ends in proximity to the receiving end of the endless carrier and the series of drying or packing frames in proximity to the delivery end of the carrier, all substantially as described.

In testimony whereof I affix my signature in presence of two witnesses.

CHARLES MARTIN.

Witnesses:
L. N. MARTIN,
E. J. LEADLAY.